United States Patent
Hassan et al.

(10) Patent No.: US 7,280,853 B2
(45) Date of Patent: Oct. 9, 2007

(54) ULTRA WIDE BAND POWER SAVE

(75) Inventors: Amer A. Hassan, Kirkland, WA (US); Abhishek Abhishek, Woodinville, WA (US); Jenelle R. Coberly, Monroe, WA (US); Merle Michael Robinson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 523 days.

(21) Appl. No.: 11/012,814

(22) Filed: Dec. 15, 2004

(65) Prior Publication Data

US 2006/0128351 A1  Jun. 15, 2006

(51) Int. Cl.
*H04B 1/38* (2006.01)
(52) U.S. Cl. .................... 455/574; 455/343.5
(58) Field of Classification Search ............. None
See application file for complete search history.

(56) References Cited

U.S. PATENT DOCUMENTS

| | | | |
|---|---|---|---|
| 5,416,726 A | 5/1995 | Garcia-Duarte et al. | |
| 5,544,082 A | 8/1996 | Garcia-Duarte et al. | |
| 5,802,305 A | 9/1998 | McKaughan et al. | |
| 5,919,264 A | 7/1999 | Reneris | |
| 6,092,208 A | 7/2000 | Reneris | |
| 6,243,821 B1 | 6/2001 | Reneris | |
| 6,289,464 B1 | 9/2001 | Wecker et al. | |
| 6,704,584 B2 * | 3/2004 | Litwin ...................... 455/574 | |
| 2003/0198196 A1 | 10/2003 | Bahl et al. | |
| 2003/0203740 A1 | 10/2003 | Bahl et al. | |
| 2003/0210658 A1 | 11/2003 | Herbabdez et al. | |
| 2004/0180701 A1 * | 9/2004 | Livet et al. .............. 455/574 | |

* cited by examiner

*Primary Examiner*—Thanh Cong Le
(74) *Attorney, Agent, or Firm*—Wolf, Greenfield & Sacks, P.C.

(57) ABSTRACT

A network node selects a "sleep" level based on its current or projected battery capacity. In an embodiment of the invention, sleep levels define the types of communication to which the node in question will be a party. The node in question communicates its selected sleep level to the rest of the network so that the other network nodes can communicate accordingly with the node.

29 Claims, 12 Drawing Sheets

ULTRA WIDE BAND POWER SAVE

FIELD OF THE INVENTION

This invention pertains generally to power-limited computing devices and, more particularly, to power management in power-limited networked wireless computing devices.

BACKGROUND OF THE INVENTION

The digital revolution ushered in by widely available computing devices is now well under way, and a secondary wave is now occurring. The secondary wave involves enhanced interconnectivity of the various available computing devices, as users insist upon a more mobile and/or less cluttered experience. For example, a traditional desktop PC can provide a great deal of utility. However the user is tethered in place by the size of the machine as well as its various wired connections.

Today, many handheld and small devices provide substantial computing power to their users, and do so in a wireless manner, thus allowing freedom of movement. For example, cell phones, personal digital assistants, notebook computers and other devices can communicate wirelessly and are portable. For larger devices such as desktop computers, household appliances, and entertainment devices, when mobility is not a concern, wireless connectivity still allows freedom from wire clutter.

However, wireless devices, by the their nature, often lack power cables or other provisions for connecting continuously to an external power source while in use, and thus must be supported by battery power alone. While battery technology has advanced recently and higher capacity batteries are becoming available (for example, Lithium Ion and Lithium Polymer batteries), there is still a continued substantial need to conserve and properly manage energy consumption in battery-powered wireless devices.

BRIEF SUMMARY OF THE INVENTION

Embodiments of the invention solve the shortcomings inherent in prior techniques by allowing ad hoc network devices to cooperatively conserve the battery power of member devices. In particular, long battery life is important for UWB devices. In an embodiment of the invention, devices in a network collaborate to conserve as much power as possible. Typically, devices will have disparate battery capacities or power reserves; some devices may have very small power capacity while others may be able to communicate for longer.

In an embodiment of the invention, devices that have longer nominal battery life (or that are plugged into an external power source) bear more of the processing and communications burdens in order to help devices with more limited battery life to conserve power. In an embodiment of the invention, a network node selects a "sleep" level based on its current or projected battery capacity. Sleep levels define the types of communication to which the node in question will be a party. The node in question communicates its selected sleep level to the rest of the network so that the other network nodes can communicate accordingly with the node.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Figure 1:
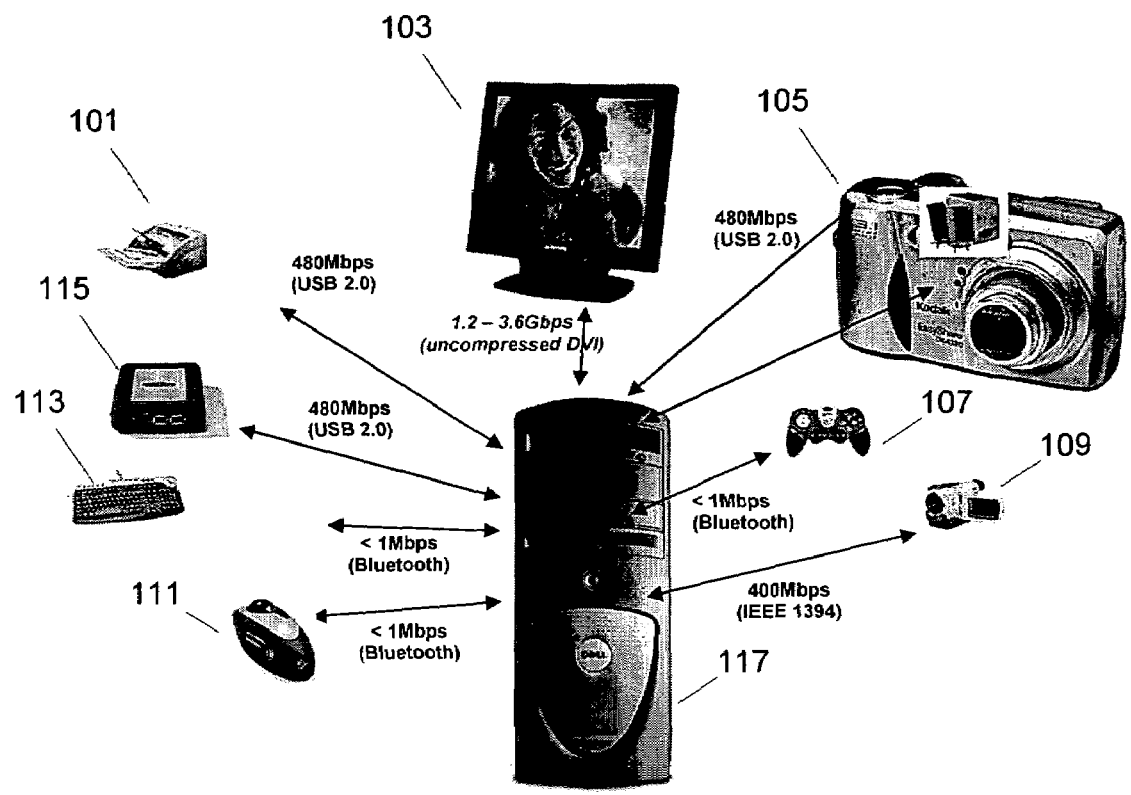
FIG. 1 is a schematic diagram of a wireless desktop device cluster within which embodiments of the invention may be implemented.

Embodiments of the invention will be described herein by reference to the Ultra Wideband (UWB) wireless communication technology, although it will be appreciated that the techniques described herein are useable with respect to devices implementing other communications technologies as well. UWB is sometimes alternatively referred to as impulse, baseband or zero-carrier technology. UWB is a wireless communications technology that transmits very short ultra-low power radio signals across a wide frequency spectrum. UWB receivers can translate the received burst by recognizing a particular pulse sequence sent by the transmitter. The FCC has defined UWB as including any signal that occupies more than 500 MHz or having more than 20% fractional bandwidth, in the 3.1 GHz to 10.6 GHz band. The bandwidth of a UWB signal is typically around 25% of the center frequency. For example, a "2 GHz" UWB signal may have a bandwidth of 500 MHz. One benefit of UWB is the ability to detect the range to other ultra wideband devices using round-trip delay time.

The spectrum allowed for UWB is 7500 MHz. This is substantially greater than the spectrum for other technologies in the United States. For example, ISM at 2.4 GHz encompasses an 83.5 MHz spectrum, while U-NI at 5 GHZ takes up 300 MHz (to be increased to 555 MHz). The broad spectrum of UWB allows it to be useful in PC cluster and home cluster scenarios where broadband connectivity is required. For example, a PC cluster may comprise a PC and a storage device and/or an IO device, such as a docking station, and/or a printer or other peripheral, all wirelessly interconnected. In a home cluster, a computer such as a PC or laptop may be wirelessly connected to consumer electronics devices such as a digital camera, video camera, MP3 player, projector, TV, etc., allowing high-speed content transfers. Another potential home cluster environment is within an automobile or other vehicle. Typical bandwidth requirements for consumer electronic and entertainment applications is as follows: HDTV, 19 Mbps; DVD player, 10 Mbps; MPEG2, 1-8 Mbps; MPEG1, 1.5 Mbps; Broadband access, 1-10 Mbps; Video Conference, 1-2 Mbps; TV terminal, 2-5 Mbps; Stereo CD player, 1.4 Mbps; Computer Network, 1-10 Mbps; and Telephone, 8-64 kbps.

The power of a UWB signal is typically very low. For example, a UWB signal may be on the order of 1000 times lower than that currently used for Wi-Fi RF transmissions. The low power requirement is enabled by the ease of detectability of UWB signals, i.e. the ease with which the signal may be extracted from background noise.

The modulation technique used for UWB is typically binary phase-shift keying (BPSK). In BPSK, each pulse is sent at zero or 180 degrees, i.e., right side up or inverted. Thus, BPSK modulation is efficient in its use of the spectrum, requiring about half the bandwidth of a comparable pulse position modulation system.

The current work regarding UWB technology is focused on development of a standard for wireless personal area networks (PANs), i.e., IEEE 802.15.3a. The purpose of this task group is to provide a specification for low complexity, low cost, low power consumption and high data rate wireless connectivity between wireless devices within or entering the personal operating space (PO). The data rate must be sufficiently high (greater than 110 Mbps) to satisfy a set of consumer multimedia industry needs for wide personal area network (WPAN) communications. The present requirements are as follows: data rate at 10 meters—110 Mbps; data rate at 4 meters—200 Mbps; optional data rate at 1 meter—430 Mbps; power consumption—100-250 mW; bit error rate—$10^{-5}$; co-located uncoordinated piconets—4; interference capability—robust to IEEE systems; and co-existence capability—reduced interference to IEEE systems.

Figure 2:
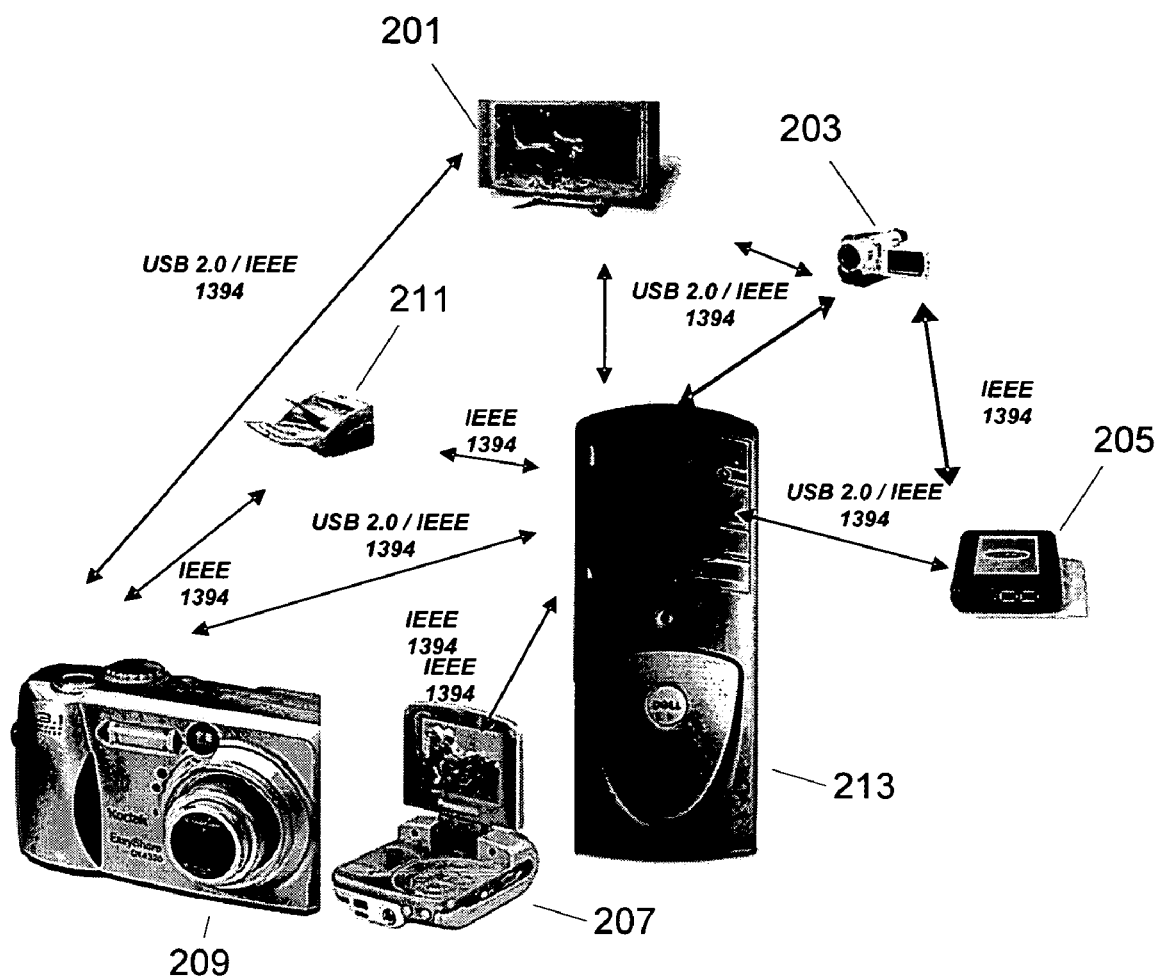
FIG. 2 is a schematic diagram of an ad hoc wireless consumer electronics network within which embodiments of the invention may be implemented.
Figure 3:
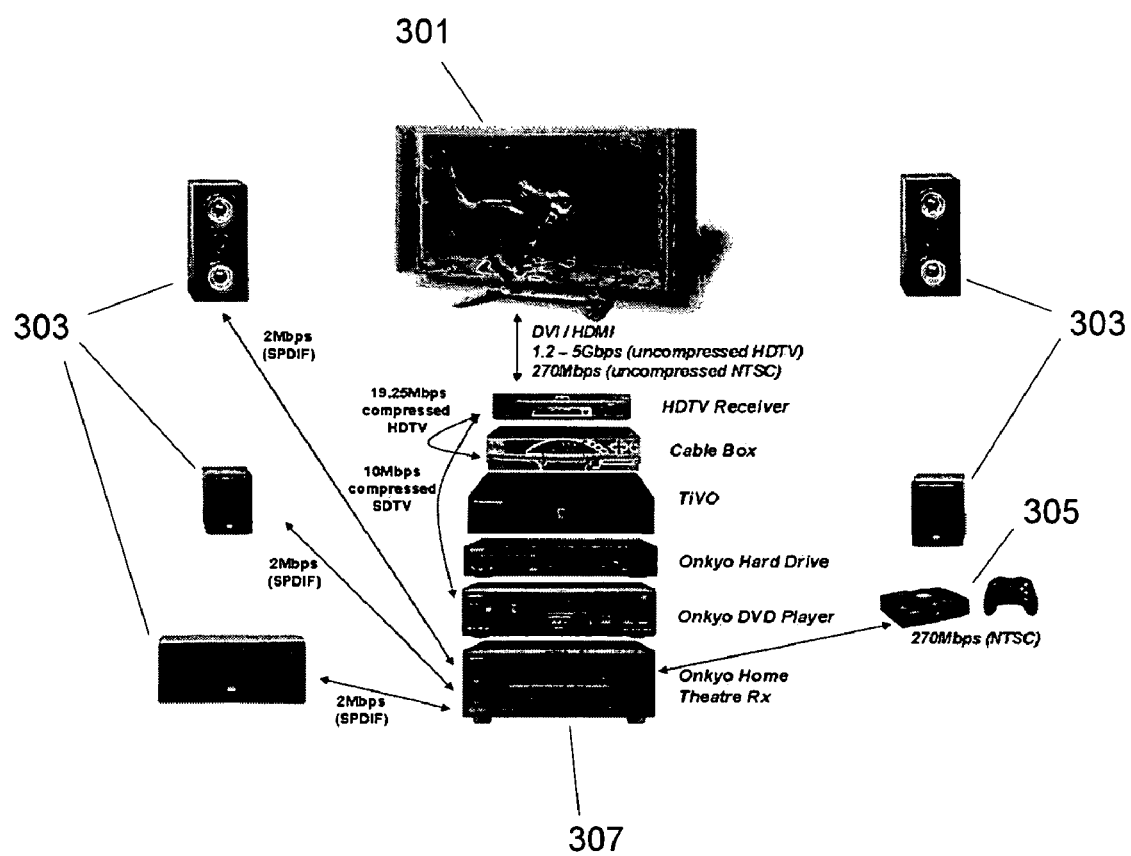
FIG. 3 is a schematic diagram of a wireless home entertainment network within which embodiments of the invention may be implemented.

A number of device environments within which embodiments of the invention may be used are illustrated in FIGS. 1-3. FIG. 1 shows an exemplary wireless desktop device cluster. Exemplary devices shown include a printer 101, monitor 103, camera 105, game controller 107, video camera 109, mouse 111, keyboard 113, and tablet 115. The various devices communicate wirelessly via a personal computer 117. The wireless protocol of each device need not be the same. For example, a number of protocols are shown including IEEE 1394, USB 2.0, USB 1.0, and Bluetooth.

FIG. 2 illustrates an ad hoc wireless consumer electronics network. The network contains exemplary devices including a flat screen television 201, video camera 203, modem 205, personal video player 207, digital camera 209, and printer 211, as well as a personal computer 213. The various devices are interconnected by a suitable wireless protocol such as IEEE 1394 and/or USB 2.0.

Finally, FIG. 3 illustrates an exemplary wireless home entertainment network. The network includes a number of devices including a television 301, speakers 303, gaming devices 305, and multimedia stack 307. The multimedia stack 307 includes an HDTV receiver, cable box, Tivo box, hard drive, DVD player, and home theatre module.

There are two approaches for UWB currently proposed, namely a single band approach and a multi-band approach. The single band approach is less desirable in that it proposes to use the whole 7.5 GHz as one carrier. The multi-band approach segments the 7.5 GHz into equal channels. The basic premise is to use multiple frequency bands to efficiently utilize the UWB spectrum by transmitting multiple UWB signals at the same time. The signals don't interfere with each other because they operate at different frequencies within the UWB spectrum. Each of these signals can be transmitted simultaneously to achieve a very high data rate or can be used as a means of multiple access to allow multiple users to communicate at the same time. Several standard digital modulation techniques can be on each individual UWB signal. The output of the modulated UWB signals can be added together before transmission.

A multi-band UWB system design has a number of advantages including: more scalable and adaptive than single band designs; better co-existence characteristics with systems such as 802.11a; and lower risk implementations because it leverages more traditional radio design techniques. These advantages can be retained while maintaining similar complexity and power consumption levels as single band designs.

With respect to being scalable and adaptive, an advantage of the multi-band approach is that, for example, low bit rate systems can use few bands, high bit rate systems can use many bands. Another advantage is to be potentially adaptive to different radio regulations worldwide, in the event that they do not have the same harmonized spectrum allocations, as happened for the 2.4 GHz and 5 GHz bands used by WiFi and Bluetooth.

With respect to co-existence, another advantage of the multi-band approach is to increase the level of coexistence with other services such as IEEE 802.11a. A receiver can dynamically adjust the in-band interference by removing the affected band, or a transmitter can avoid transmitting in a band already used by another service in close proximity.

Finally, since the multi-band technique is based on well known wireless communications scheme, modified for use with the UWB spectrum, the technology presents lower implementation risk. This makes multi-band the best candidate for commercial applications that require standards technology and multiple vendors for high volume adoption.

Multi-band systems permit adaptive selection of the bands to provide good interference robustness and co-existence properties. When the system detects the presence of an 802.11a system, for example, it can avoid the use of the bands centered at 5.35 GHz or 5.85 GHz. This same feature can also be utilized to provision for different spectrum allocations outside of the United States; the bands that share the spectrum with extremely sensitive systems can be avoided.

A single band UWB system would need to employ notch filters to achieve the same result. Notch filters are not an ideal solution because they either increase the receiver's noise figure or require higher performance Low Noise Amplifiers. The problem with notch filters is that they are not adaptive and need to be realized with off-chip dedicated hardware. In addition, notch filters in most cases distort the receive pulse and require additional complexity to compensate for this effect.

Figure 4:
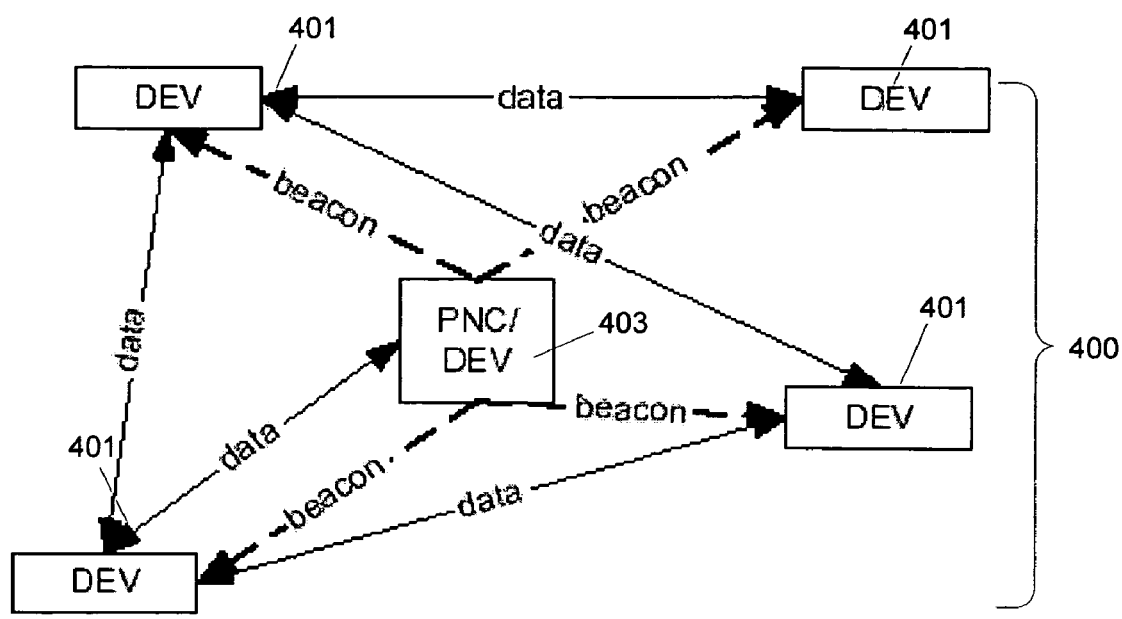
FIG. 4 is a schematic diagram illustrating an exemplary generalized computer networking environment suitable for incorporating embodiments of the invention.

The UWB MAC then consists of several components shown in FIG. 4. The basic component is the device or DEV 401. One DEV 403 will typically assume the role of the piconet coordinator (PNC) of the piconet 400.

The PNC 403 performs the following functionality: provides basic timing for the piconet 400 with the beacon; manages the quality of service (QoS) requirements; manages power save levels; and implements security and access control for the piconet 400. Because a piconet 400 is formed with no pre-planning and for as long as the piconet 400 is needed, this type of operation is referred to as an ad hoc network.

The MAC allows a DEV 401 to request the formation of a subsidiary piconet. The original piconet 400 is referred to as the parent piconet. The subsidiary piconet is referred to as either a child or neighbor piconet, depending on the method the DEV 401 used to associate with the parent PNC 403. Child and neighbor piconets are referred to collectively as dependent piconets since they rely on the parent PNC 403 to allocate channel time for the operation of the dependent piconet. An independent piconet is a piconet that does not have any dependent piconets.

Since very long battery life is considered one key feature for UWB devices (PNC or DEV), it is important these devices collaborate in a piconet setting to conserve as much power as possible. For a given piconet, devices will have unequal battery life. That is, some will have very short life while others may be able to communicate for longer. Traditionally, wireless devices go into sleep mode based on a broadcast channel and amount of activity addressed to that particular client.

As noted above, low power consumption and long battery life are important attributes of UWB devices. In an embodiment of the invention, network members coordinate among themselves to collectively conserve power. For example, devices that have longer nominal battery life (or that are plugged into an external power source) can bear more of the processing and communications burdens, thus helping devices with more limited battery life to conserve power.

For example, in an embodiment of the invention, a network node can select a "sleep" level to enter based on its current or projected battery capacity. The node in question communicates its selected sleep level directly or indirectly to the rest of the network so that the other network nodes can communicate accordingly with the node. This arrangement according to an embodiment of the invention will be described in greater detail below.

Figure 5:
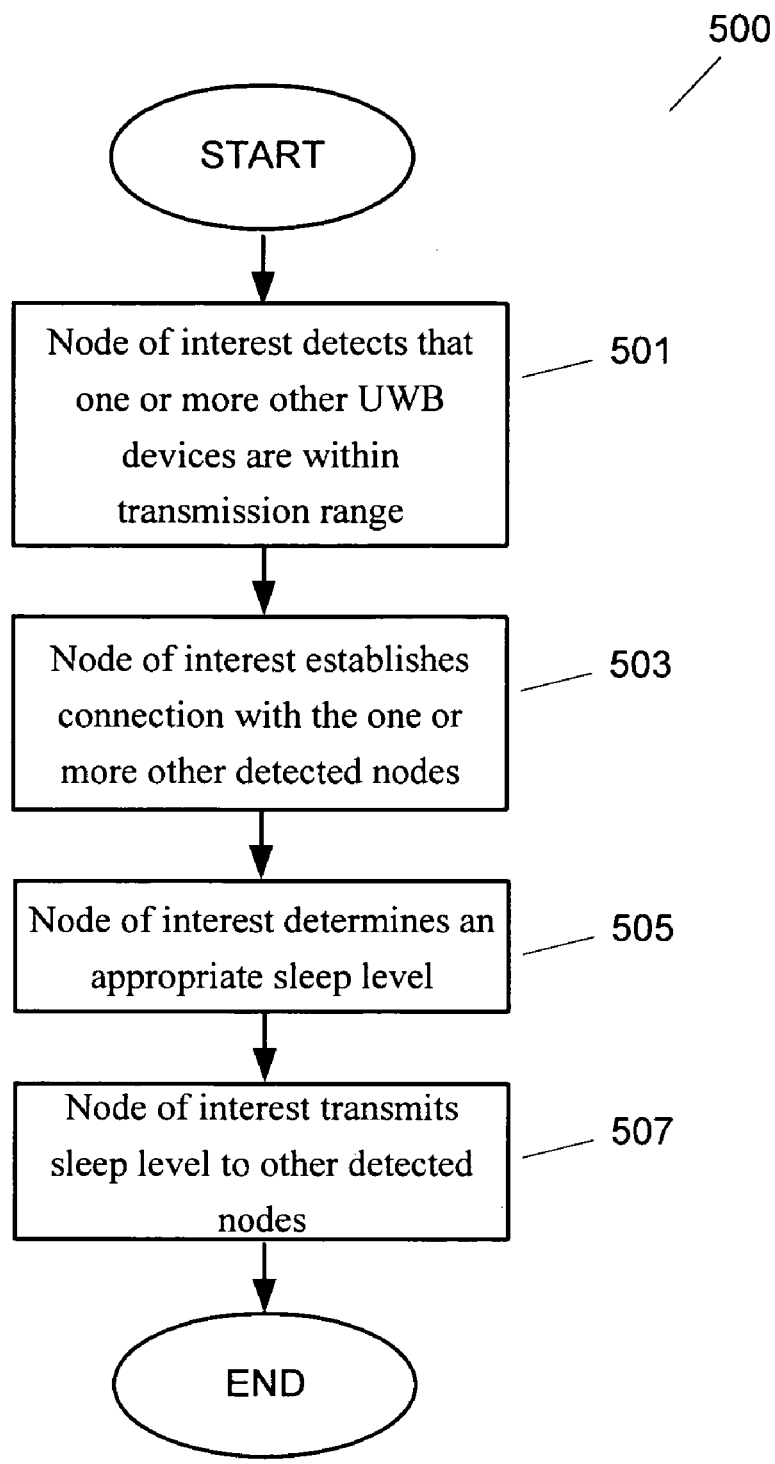
FIG. 5 illustrates a flow chart corresponding to a process of selecting and broadcasting a sleep level within a network according to an embodiment of the invention.
Figure 12:
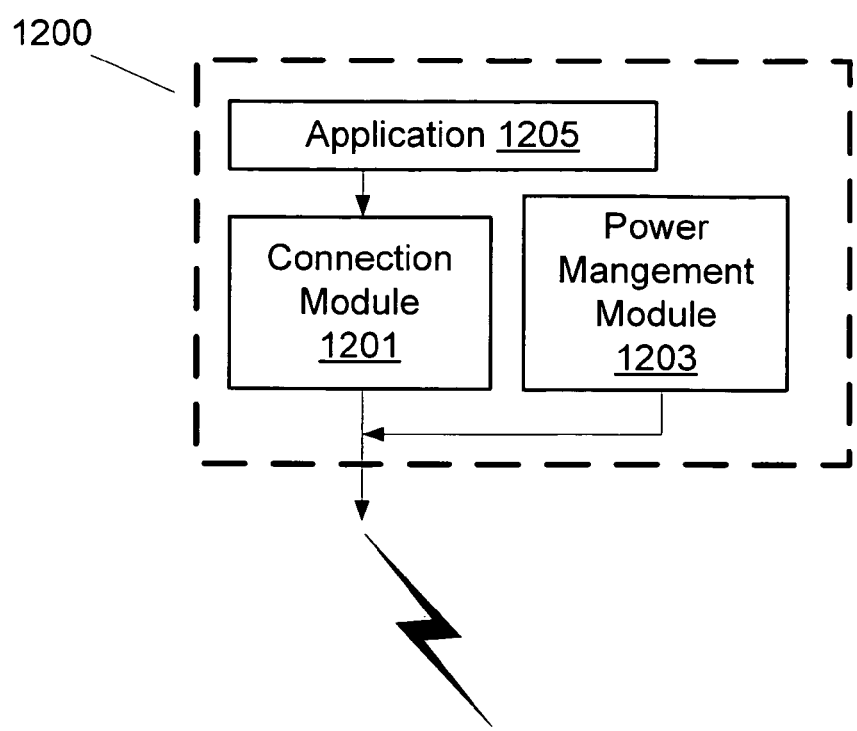
FIG. 12 illustrates a network node having a connection module and a power management module in accordance with one embodiment of the invention.

FIG. 5 illustrates a process for forming an ad hoc network from the standpoint of a potential node in the network. For clarity, FIG. 5 focuses on the aspects of an embodiment of the invention and omits networking details that are familiar to those of skill in the art. The description of FIG. 5 will proceed in conjunction with a description of FIG. 12, which illustrates a node schematically with respect to the portions generally involved in embodiments of the invention.

In step 501 of the flow chart 500, a node, such as node 401 of FIG. 4, detects that one or more other UWB devices are within transmission range of the node. This detection can be performed by a connection module such as module 1201 of node 1200, or other entity. In step 503, the node of interest establishes a connection via connection module 1201 with the one or more other detected nodes in a manner that will be known to those of skill in the art. Once a connection is established, the node of interest determines an appropriate sleep level via a power management module 1203 in step 505 and transmits its sleep level to the one or more other nodes in step 507 using the connection module 1201. Applications such as application 1205 that use the wireless connection facilities of the node 1200 need not be aware of or involved in the management of the connection and sleep levels as discussed above.

Figure 6:
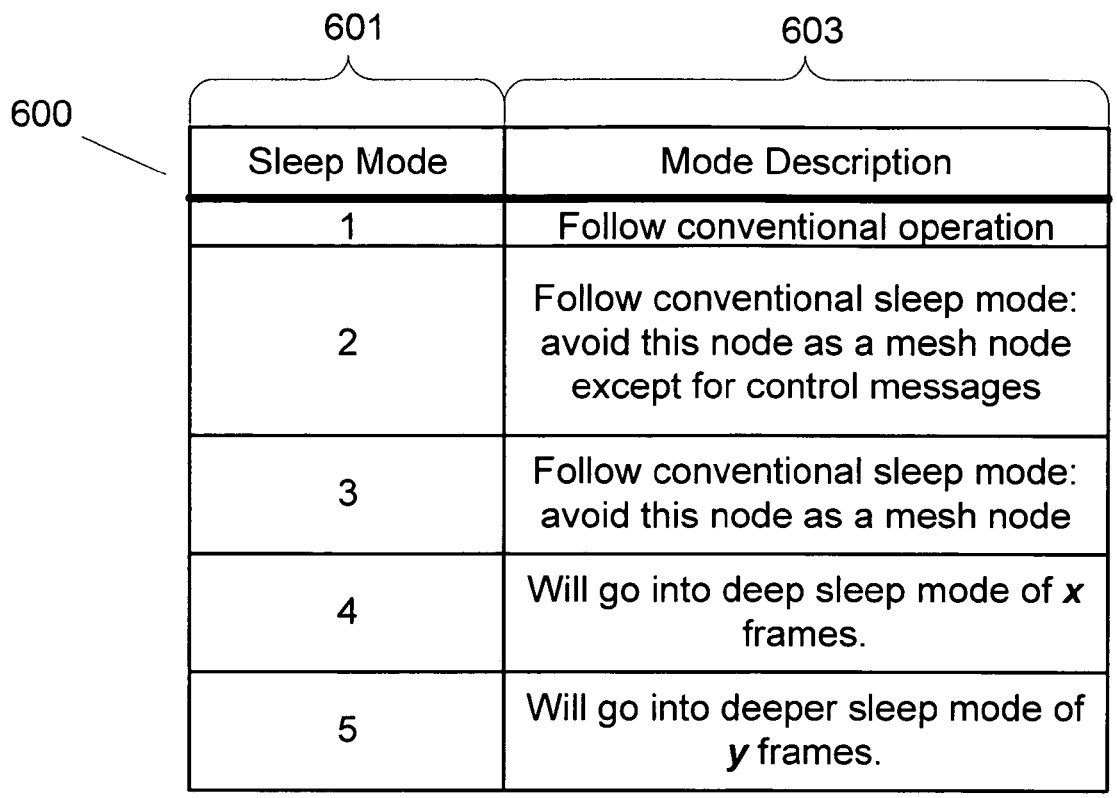
FIG. 6 is a table illustrating sleep level numbers and their corresponding requirements in an embodiment of the invention.

As discussed above, the node of interest chooses an appropriate sleep level and transmits an identification of the selected level to other network nodes. FIG. 6 is a table setting forth exemplary sleep levels. The node chooses a sleep level based on energy conservation criteria according to an embodiment of the invention. In a further embodiment of the invention, the remaining capacity of the node's battery is used as a criterion to select a sleep level.

In the illustrated embodiment of the invention, there are five sleep levels, although a greater or lesser number of levels may be made available depending upon user preferences. The table 600 illustrates the five sleep levels in column 601 and the consequences of each level in column 603. The first level, labeled "1," is selected when the battery power of the node is above a highest threshold. In this level, the node is to be treated as an ordinary node with no special considerations. The second level, labeled "2," is selected when the battery power of the node is between a second highest threshold and the highest threshold. In this level, the node follows conventional sleep level (i.e. waking up periodically to transmit and receive) and is to be avoided as a mesh node except for control messages. For example, messages pertaining to the status of the network, particularly as it affects that node, are passed through in this level, while user data (pictures, audio, application data, etc.) are not.

The third level, labeled "3," is selected when the battery power of the node is between a third highest threshold and the second threshold. In this level, the node is to be avoided as a mesh node entirely. Thus, the node may wake up periodically and transmit any data it needs to, but will not receive control messages or any other data from the other nodes. The wake up interval can be standardized, such as every ½₀ of the full transmit interval. In this sleep level, certain transmissions such as beacons are still received (i.e. the node will awake for such even if the sleep interval has not expired).

The fourth level, labeled "4," is selected when the battery power of the node is between a fourth highest threshold and the third threshold. In this level, the node is in deep sleep of x frames. Thus, the node will wake up every $x^{th}$ frame to transmit any data it needs to, but will not receive control messages or any other data from the other nodes.

The fifth level, labeled "5," is selected when the battery power of the node is between a lowest threshold and the fourth threshold. In this level, the node is in deep sleep of y frames. Thus, the node will wake up every $y^{th}$ frame (where y>x) to transmit any data it needs to, but will not receive control messages or any other data from the other nodes. With respect to the fourth and fifth levels, it is preferable that the node in question specify the number of frames for which it will sleep. However, in an embodiment of the invention, the number of frames is standardized and specification of the level serves to specify the number of frames.

The thresholds are a matter of user preference. However, in an embodiment of the invention, the thresholds correspond to approximately 20% increments (or similar equal increments for other numbers of sleep levels). Thus, level 1 corresponds to greater than 80% remaining battery capacity, level 2 corresponds to greater than 60% remaining battery capacity, level 3 corresponds to greater than 40% remaining battery capacity, level 4 corresponds to greater than 20% remaining battery capacity, and level 5 corresponds to 20% or less remaining battery capacity.

It will be appreciated that in a network such as an ad hoc network, transmissions between nodes can be direct or can utilize intermediate nodes. Moreover, although the illustrated process transmits an indication of a sleep level at the time of connection, it will be appreciated that sleep level can be periodically transmitted or may be transmitted only when it changes.

Figure 7:
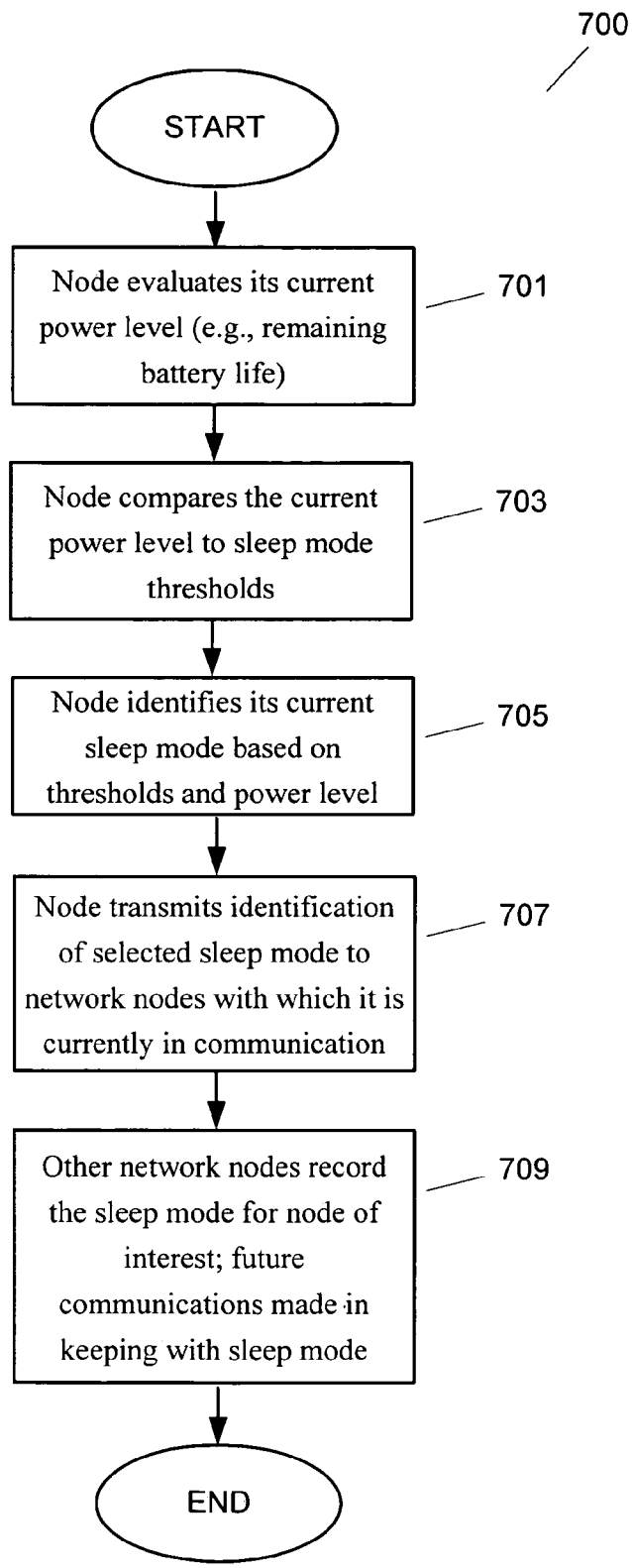
FIG. 7 illustrates a flow chart corresponding to a process of selecting a sleep level based on remaining power capacity according to an embodiment of the invention.

FIG. 7 illustrates a flow chart 700 for the process of a node changing its sleep level during operation of the network, such as in response to a decrease in remaining battery life. In step 701, the node evaluates its current power level (e.g., remaining battery life). In step 703, the node compares the current power level to sleep level thresholds. In step 705, the node identifies its current sleep level based on which thresholds the power level lies between.

In step 707, the node transmits an identification of the selected sleep level to the network nodes with which it is currently in communication. There may be other nodes with which the node of interest is not directly in communication, but the sleep level indication is preferably forwarded to such nodes by one or more of the direct recipients. In step 709, the network nodes other than the node of interest record the sleep level for the node of interest, such that future communications are made only in accordance with the selected sleep level.

The way in which the sleep level indication is transmitted is not critical to the above described embodiments of the invention. However, in further embodiments of the invention, two primary transmission mechanisms are used respectively. In summary, the first mechanism provides for transmission of the sleep level indicator in a fractional time domain allocation while the second mechanisms provides for transmission of the sleep level indicator in a fractional frequency domain allocation.

Figure 8:
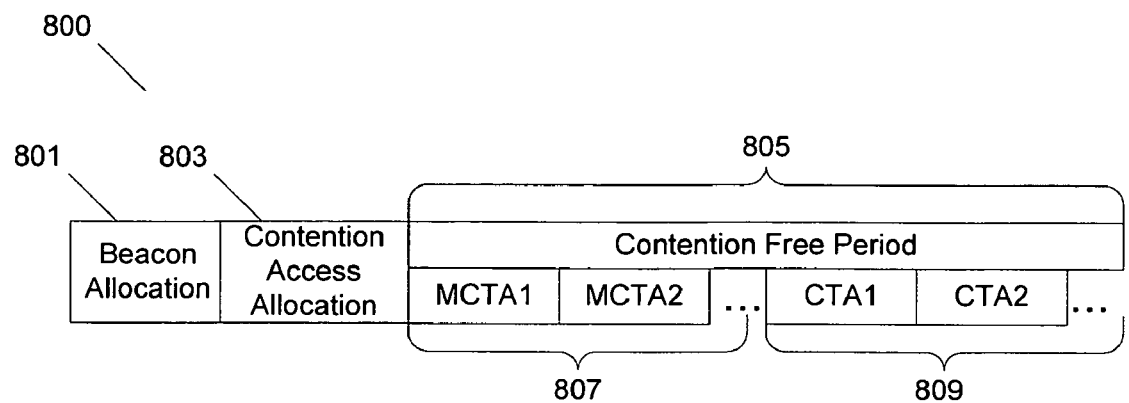
FIG. 8 is a schematic timing diagram of a UWB frame illustrating transmission of a sleep level according to an embodiment of the invention.

FIG. 8 illustrates a mechanism for transmission of the sleep level indicator in a fractional time domain allocation, although it will be appreciated that other mechanisms for transmitting the sleep level indicator can be used. The schematic illustration of FIG. 8 shows a frame 800 in a UWB transmission. The frame comprises generally control or administrative data and user data. The frame begins with a beacon allocation 801. The beacon allocation 801 is typically used to send synchronization information as well, potentially, as other administrative information if necessary. In an embodiment of the invention, the sleep level indication is placed in the beacon allocation 801.

After the beacon allocation 801, a contention access allocation 803 is provided. The contention access allocation 803 is usable by the transmitting node to send data on a contention basis. Following the contention access allocation 803, the remainder 805 of the frame is contention free.

The contention free portion 805 of the frame comprises management channel time allocations (MCTAs) 807, as well as channel time allocations (CTAs) 809. The MCTAs 807 are usable for sending management and control information on a non-contention basis. The CTAs are used to transmit user data (e.g., video, audio, etc.) on a non-contention basis. In a further embodiment of the invention, the sleep level indicator is transmitted in one of the MCTAs 807. This is desirable for example when there is no excess capacity in the beacon allocation 801.

Figure 9:
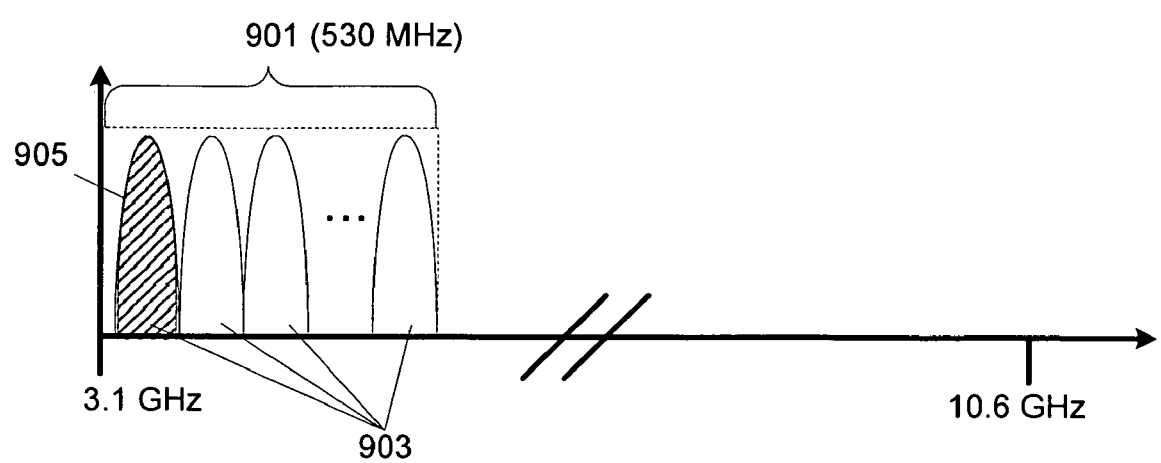
FIG. 9 is a frequency spectrum diagram illustrating transmission of a sleep level according to an alternative embodiment of the invention.

In an alternative embodiment of the invention, the sleep level indicator is transmitted in a fractional frequency domain allocation. An exemplary manner in which this is implemented is shown in FIG. 9. In particular, FIG. 9 is a schematic frequency diagram showing an allocation of the frequency space occupied by a UWB signal according to an embodiment of the invention. In the OFDM proposal for UWB, the UWB signal 901 is 530 MHz wide, and is divided into many channels 903. A selected one 905 of these channels 903 is used to transmit the sleep level information in this embodiment of the invention.

As described above, a node of interest selects a sleep level based on its power level and transmits that sleep level to other nodes in an embodiment of the invention. In this manner, the network devices cooperate to conserve the power of network devices in a manner dictated by those devices. The sleep levels described above differentiate data based on type but not on data source or target.

In an alternative embodiment of the invention, one or more sleep levels differentiate data based on a source or target of the data. For example, while a first sleep level may permit all types of communications to all devices, a lower sleep level may restrict the sources or targets to closer devices. A reduction in communication range (and hence RF power) aids a device in conserving power.

Figure 10:
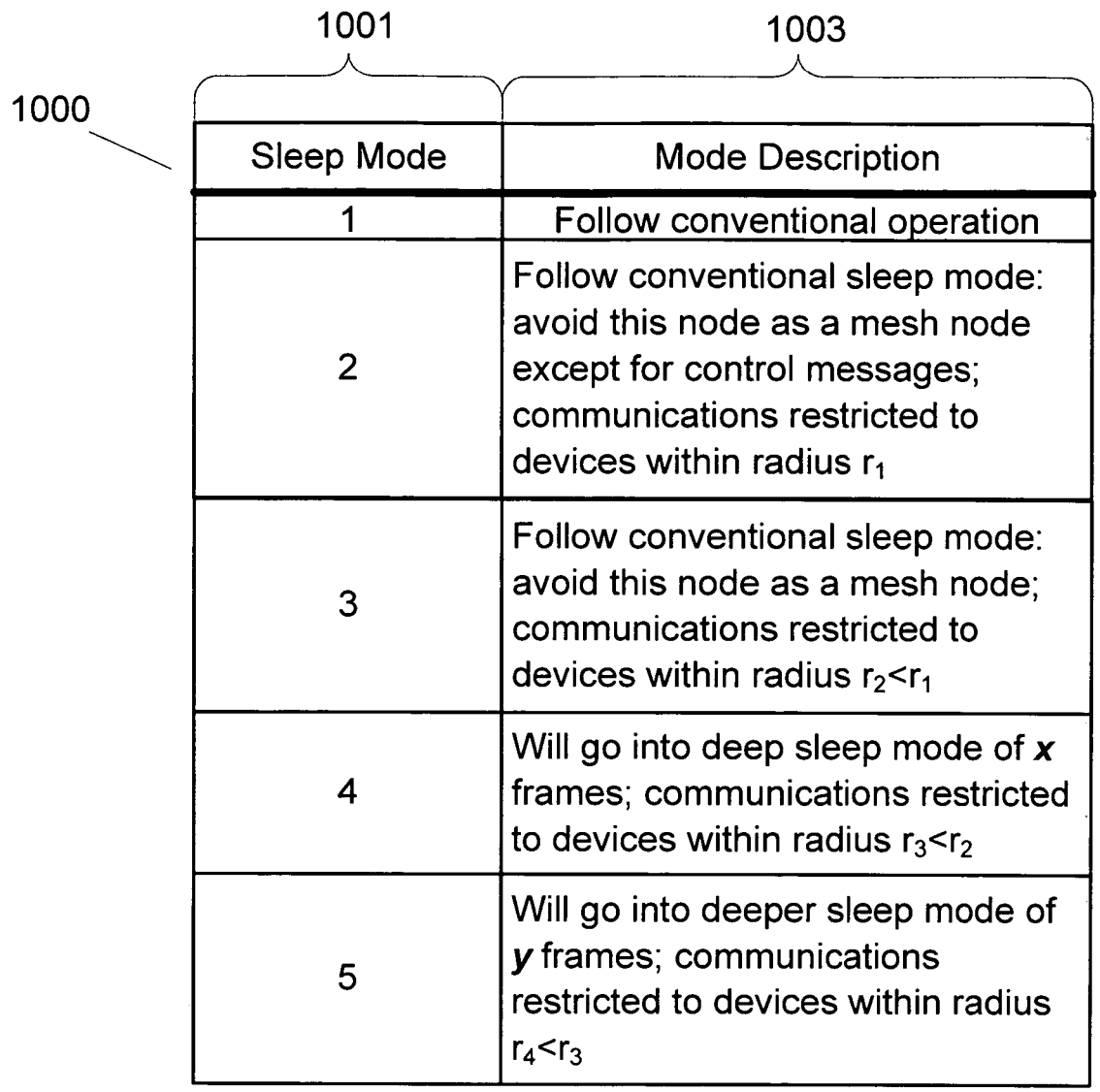
FIG. 10 is a table illustrating sleep level numbers and their corresponding requirements, including communications radius restrictions, in an alternative embodiment of the invention.

FIG. 10 illustrates a sleep level chart associating relative power levels with sleep levels and their requirements. In increasing levels, the radius of communication decreases, and thus the RF power required to communicate decreases. Thus, in sleep level 1, the radius is not restricted. In sleep level 2, communications are restricted to all devices within radius $r_1$. Similarly, in sleep level 3, communications are restricted to all devices within radius $r_2 < r_1$. In sleep level 4, communications are restricted to all devices within radius $r_3 < r_2$. Finally, in sleep level 5, communications are restricted to all devices within radius $r_4 < r_3$. It should be appreciated that the communications radius restrictions may pertain to only a small subset of the sleep levels in an embodiment of the invention. For example, in an embodiment of the invention, only the last two sleep levels have communications radius restrictions associated with them.

Although the invention may be used in conjunction with networks formed from a wide array of device types possibly but not necessarily including a traditional PC or laptop computer, a description of one type of computer in which various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), handheld devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 11:
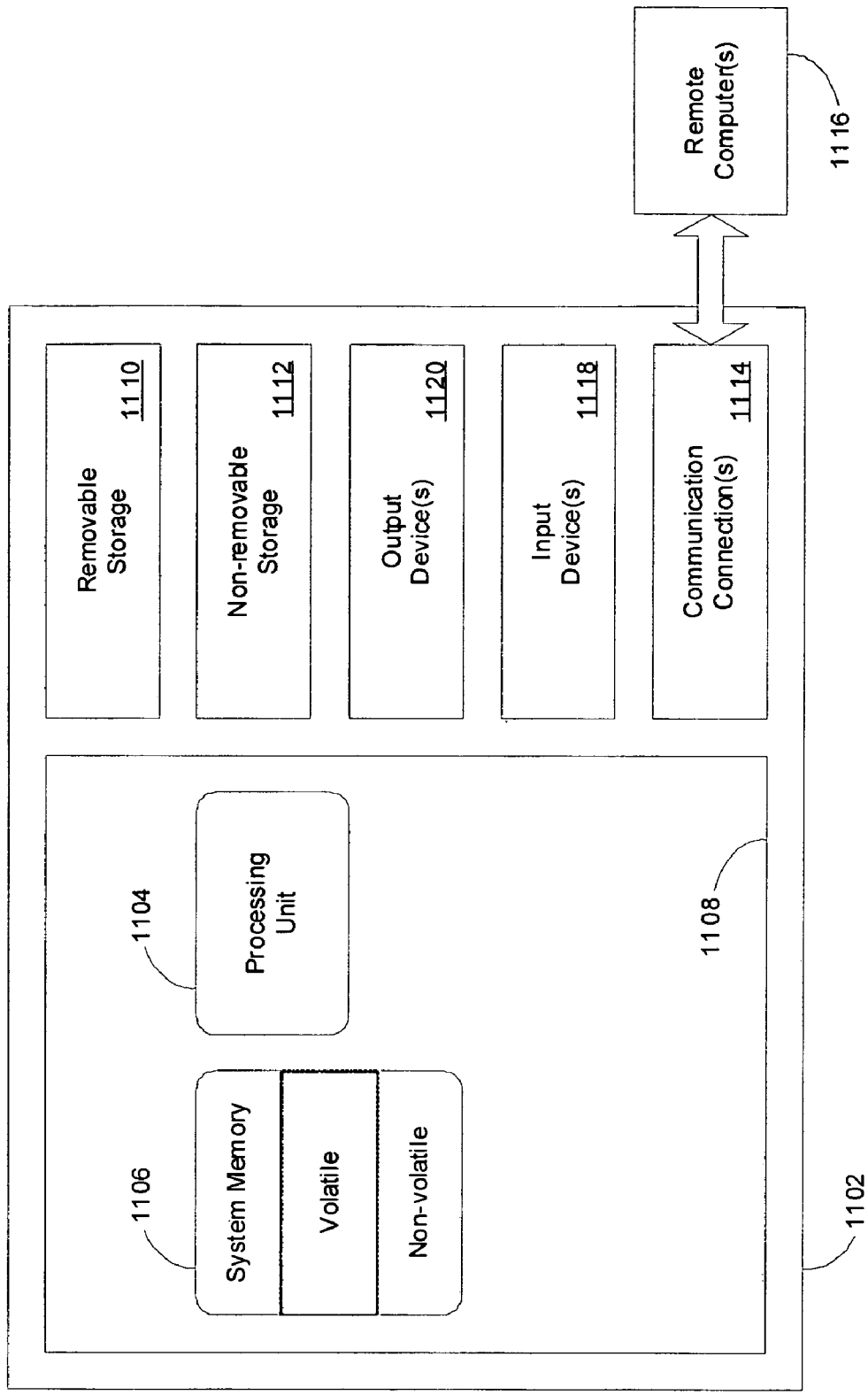
FIG. 11 is a schematic diagram generally illustrating an exemplary computer system usable to implement an embodiment of the invention.

Referring to FIG. 11, an example of a basic configuration for the computer 1102 on which aspects of the invention described herein may be implemented is shown. In its most basic configuration, the computer 1102 typically includes at least one processing unit 1104 and memory 1106. The processing unit 1104 executes instructions to carry out tasks in accordance with various embodiments of the invention. In carrying out such tasks, the processing unit 1104 may transmit electronic signals to other parts of the computer 1102 and to devices outside of the computer 1102 to cause some result. Depending on the exact configuration and type of the computer 1102, the memory 1106 may be volatile (such as RAM), non-volatile (such as ROM or flash memory) or some combination of the two. This most basic configuration is illustrated in FIG. 11 by dashed line 1108.

The computer 1102 may also have additional features/functionality. For example, computer 1102 may also include additional storage (removable 1110 and/or non-removable 1112) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 1102. Any such computer storage media may be part of computer 1102.

The computer 1102 preferably also contains communications connections 1114 that allow the device to communicate with other devices such as remote computer(s) 1116. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 1102 may also have input devices 1118 such as a keyboard/keypad, mouse, pen, voice input device, touch input device, etc. Output devices 1120 such as a display, speakers, a printer, etc. may also be included. All these devices are well known in the art and need not be described at length here.

All references, including publications, patent applications, patents and appendices, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of conserving power in a first wireless network node on a wireless network having a plurality of network nodes, the first network node having a depletable power source having a remaining power capacity, the method comprising:
   detecting at the first wireless network node the remaining power capacity of the depletable power source;
   comparing the remaining power capacity of the depletable power source to a plurality of sleep level thresholds, the sleep level thresholds each being associated with a different respective remaining power capacity level and being associated with a respective sleep level, each sleep level having at least one requirement;
   selecting based on the step of comparing a sleep level for the first wireless network node to enter; and
   transmitting to one or more of the plurality of network nodes an identification of the selected sleep level, whereby subsequent communication to and from the first wireless network node are consistent with the at least one requirement of the selected sleep level.

2. The method of conserving power in a first wireless network node according to claim 1, wherein the at least one requirement of the sleep level defines a type of communication in which the first wireless network node will engage.

3. The method of conserving power in a first wireless network node according to claim 2, wherein each of the plurality of sleep levels includes a requirement defining a respective type of communication in which the first wireless network node will engage.

4. The method of conserving power in a first wireless network node according to claim 1, wherein the wireless network comprises a wireless desktop device cluster.

5. The method of conserving power in a first wireless network node according to claim 1, wherein the wireless network comprises a wireless consumer electronics network.

6. The method of conserving power in a first wireless network node according to claim 1, wherein the wireless network comprises a wireless home entertainment network.

7. The method of conserving power in a first wireless network node according to claim 1, wherein the wireless network comprises an ad hoc network.

8. The method of conserving power in a first wireless network node according to claim 1, wherein a UWB transmission is divided into temporal slots and wherein transmitting an identification of the selected sleep level comprises transmitting the identification in a selected temporal slot.

9. The method of conserving power in a first wireless network node according to claim 8, wherein the selected temporal slot is selected from the group consisting of a beacon slot and a management data slot.

10. The method of conserving power in a first wireless network node according to claim 1, wherein a UWB transmission is divided into spectral divisions and wherein transmitting an identification of the selected sleep level comprises transmitting the identification in a selected spectral division.

11. The method of conserving power in a first wireless network node according to claim 1, wherein transmitting an identification of the selected sleep level comprises transmitting the identification during connection of the first wireless network node to the network.

12. The method of conserving power in a first wireless network node according to claim 1, wherein transmitting an identification of the selected sleep level comprises transmitting the identification after connection of the first wireless network node to the network.

13. The method of conserving power in a first wireless network node according to claim 12, wherein transmitting an identification of the selected sleep level comprises transmitting the identification periodically.

14. A computer-readable medium having thereon computer-executable instructions for performing a method of conserving power in a first wireless network node on a wireless network having a plurality of network nodes, the first network node having a depletable power source having a remaining power capacity, the instructions including instructions for:
   detecting at the first wireless network node the remaining power capacity of the depletable power source;
   comparing the remaining power capacity of the depletable power source to a plurality of sleep level thresholds, the sleep level thresholds each being associated with a different respective remaining power capacity level and being associated with a respective sleep level, each sleep level having at least one requirement;
   selecting based on the step of comparing a sleep level for the first wireless network node to enter; and
   transmitting to one or more of the plurality of network nodes an identification of the selected sleep level, whereby subsequent communication to and from the first wireless network node are consistent with the at least one requirement of the selected sleep level.

15. The computer-readable medium according to claim 14, wherein the at least one requirement of the sleep level defines a type of communication in which the first wireless network node will engage.

16. The computer-readable medium according to claim 15, wherein each of the plurality of sleep levels includes a requirement defining a respective type of communication in which the first wireless network node will engage.

17. The computer-readable medium according to claim 14, wherein the wireless network comprises a wireless desktop device cluster.

18. The computer-readable medium according to claim 14, wherein the wireless network comprises a wireless consumer electronics network.

19. The computer-readable medium according to claim 14, wherein the wireless network comprises a wireless home entertainment network.

20. The computer-readable medium according to claim 14, wherein the wireless network comprises an ad hoc network.

21. The computer-readable medium according to claim 14, wherein a UWB transmission is divided into temporal slots and wherein transmitting an identification of the selected sleep level comprises transmitting the identification in a selected temporal slot.

22. The computer-readable medium according to claim 21, wherein the selected temporal slot is selected from the group consisting of a beacon slot and a management data slot.

23. The computer-readable medium according to claim 14, wherein a UWB transmission is divided into spectral divisions and wherein transmitting an identification of the selected sleep level comprises transmitting the identification in a selected spectral division.

24. The computer-readable medium according to claim 14, wherein transmitting an identification of the selected sleep level comprises transmitting the identification during connection of the first wireless network node to the network.

25. The computer-readable medium according to claim 14, wherein transmitting an identification of the selected sleep level comprises transmitting the identification after connection of the first wireless network node to the network.

26. The computer-readable medium according to claim 25, wherein transmitting an identification of the selected sleep level comprises transmitting the identification periodically.

27. A wireless network node having a depletable power source having a remaining capacity, the node comprising:
   a connection module for detecting that one or more other wireless devices are within communication range of the wireless network node and for establishing respective connections with the one or more other detected nodes;
   a power management module for evaluating the remaining capacity of the depletable power source and for determining a sleep level, from a plurality of available sleep levels, for the wireless network node based on the remaining capacity, wherein each sleep level comprises at least one requirement, and for transmitting an indication of the determined sleep level to the one or more other wireless devices.

28. The wireless network node according to claim 27, wherein communication to and from the wireless network node are consistent with the at least one requirement of the determined sleep level after the indication of the determined sleep level has been transmitted to the one or more other wireless devices.

29. The wireless network node according to claim 27, wherein the at least one requirement of the sleep level defines a type of communication in which the wireless network node will engage.

* * * * *